(12) United States Patent
Connor

(10) Patent No.: US 7,603,491 B2
(45) Date of Patent: Oct. 13, 2009

(54) BANDWIDTH CONSERVING PROTOCOL FOR COMMAND-RESPONSE BUS SYSTEM

(75) Inventor: Patrick L. Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1430 days.

(21) Appl. No.: 10/464,512

(22) Filed: Jun. 19, 2003

(65) Prior Publication Data
US 2004/0260856 A1  Dec. 23, 2004

(51) Int. Cl.
*G06F 13/00* (2006.01)
(52) U.S. Cl. .......................................... 710/33; 710/34
(58) Field of Classification Search .................... 710/29, 710/32–34, 40, 52, 267; 370/235, 236, 470
See application file for complete search history.

(56) References Cited
U.S. PATENT DOCUMENTS 6,195,725 B1    2/2001  Luhmann
6,205,498 B1 *  3/2001  Habusha et al. ............... 710/29
6,647,440 B1 * 11/2003  Birns et al. .................... 710/29
6,788,704 B1 *  9/2004  Lindsay ...................... 370/465
6,789,143 B2 *  9/2004  Craddock et al. ............. 710/54
2004/0034725 A1 *  2/2004  Elzur .......................... 710/22

OTHER PUBLICATIONS

Alireza Dabagh, Development Lead, Windows Networking, MicroSoft WinHEC 2002, NDIS 6.0, Apr. 16-18, 2002.

* cited by examiner

*Primary Examiner*—Khanh Dang
(74) *Attorney, Agent, or Firm*—Kenyon & Kenyon LLP

(57) ABSTRACT

A command-response bus protocol reduces the number of response transactions generated on a bus. According to an embodiment, an array of data is divided into a number of packets and transmitted over the bus in respective transactions. The transactions each include a writeback flag, which is enabled for the last packet but otherwise disabled. When a receiver of the packets observes the enabled writeback flag, it generates a response transaction. The response transaction indicates either that all packets of the array were received properly or that the commanded operation has been completed for the entire array. Overall, the number of bus transactions are reduced with respect to alternative schemes that require a response transaction for each transmitted packet.

22 Claims, 3 Drawing Sheets

100

1000

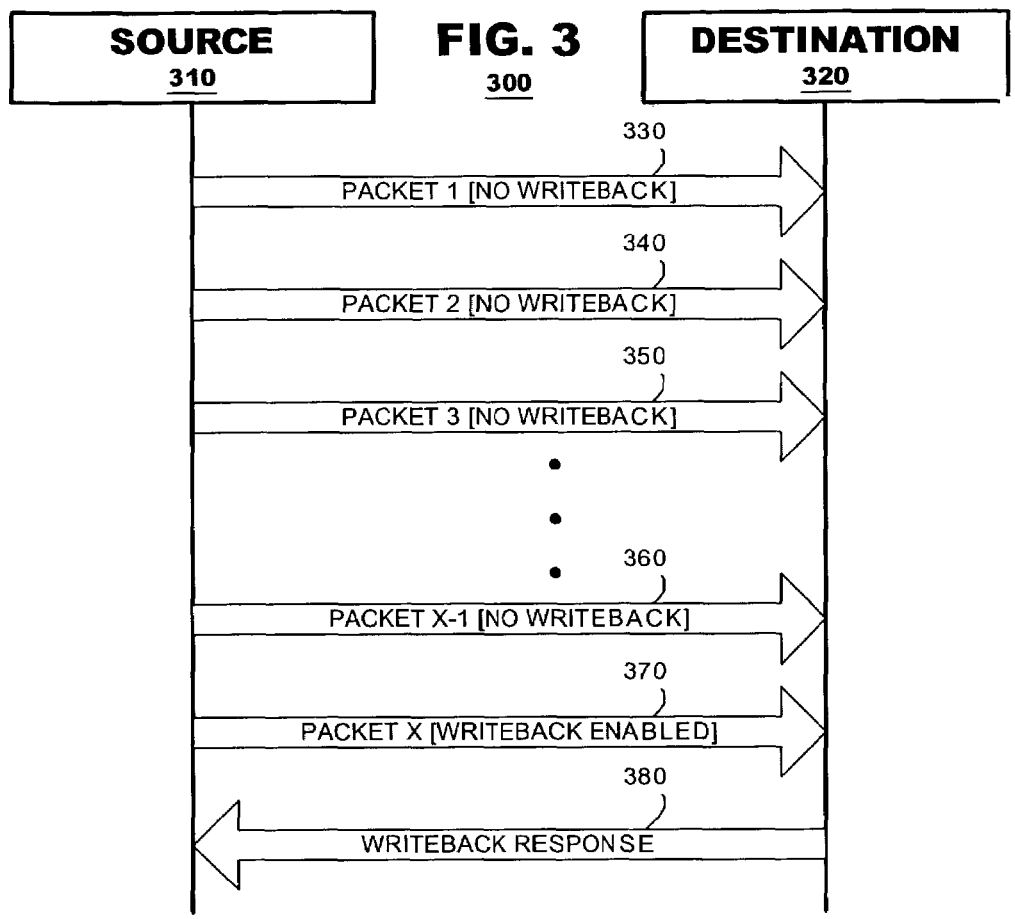
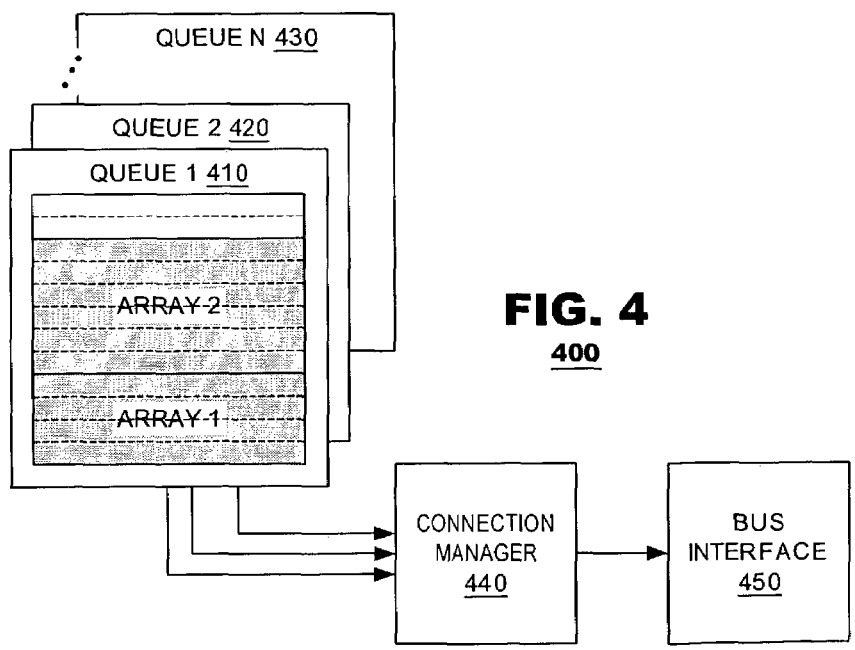

500

BANDWIDTH CONSERVING PROTOCOL FOR COMMAND-RESPONSE BUS SYSTEM

BACKGROUND

Embodiments of the present invention relate to bus protocols for devices in computing systems. In particular, the embodiments relate to bus protocols that use a command-response protocol to manage transactions.

Modern computer systems include a plurality of integrated circuit devices interconnected with other devices via computer busses. Bus architectures vary considerably among these systems and many systems, in fact, include multiples of busses having different bus architectures. The different bus architectures can include different protocols used to manage the flow of data among agents connected to the bus. For example, one bus protocol may employ a command-response protocol in which a source agent on the bus transfers a packet of data to a destination agent according to a "command" transaction posted on the bus. The "command" transaction typically includes the data and also includes an indication of what is to be done with the data. The destination agent may generate a "response" transaction indicating either that the packet was received properly or that the commanded action has been completed. The command-response protocol has been used on busses to which more than two agents are connected.

These modern systems can be "bus-limited." Conventionally, the rate at which agents can process data far exceeds the rate at which the busses between them can carry data. Thus, the speed of the bus can limit the performance of a computer system. These performance limits are particularly acute in systems where several agents are coupled to a common bus, each of them are faster than the bus and each of them compete against the other agents for bus resources.

The inventor had identified a need in the art to conserve resources of busses that operate according to the command-response protocol. In particular, the inventor recognized a need to limit the number of response transactions that are posted on the bus. These response transactions have limited utility—while they permit the source and destination agents to synchronize their operations, they do not transfer data packets themselves.

BRIEF DESCRIPTION OF THE DRAWINGS

FIG. 3 illustrates a communication flow between source and destination agents according to an embodiment of the present invention.

FIG. 4 is a simplified block diagram of a transmitting agent according to an embodiment of the present invention.

DETAILED DESCRIPTION

Embodiments of the present invention are directed to a command-response bus protocol that reduces the number of response transactions generated on the bus. According to these embodiments, an array of data is divided into a number of packets and transmitted over the bus in respective transactions. The transactions include a writeback flag, which is enabled for the last packet but disabled otherwise. When a receiver of the packets observes the enabled writeback flag, it generates a response transaction. The response transaction indicates either that all packets of the array were received properly or that the commanded operation has been completed for the entire array.

Figure 1:
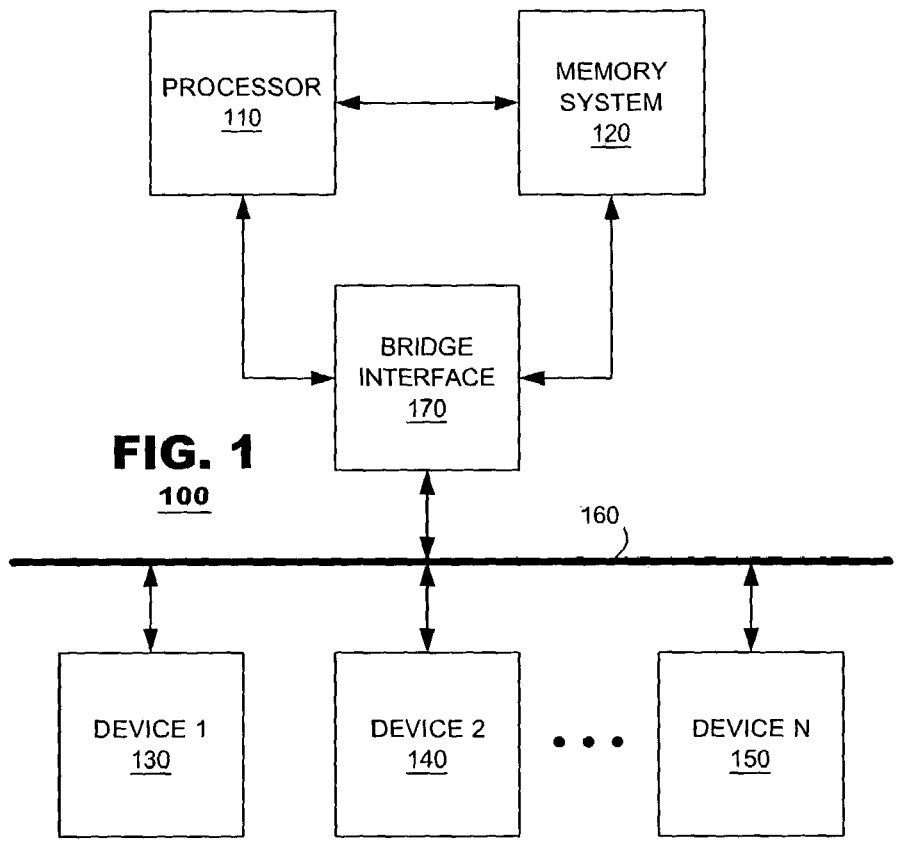
FIG. 1 illustrates a computer system according to an embodiment of the present invention.

FIG. 1 illustrates a computer system 100 according to an embodiment of the present invention. The system may include one or more processors 110 and memory systems 120 provided in mutual communication. The system further may include a plurality of peripheral devices 1-N (130, 140, 150) coupled to a communication bus 160. A bus bridge 170 may provide an interface between the processors 110 and memory systems 120 and the communication bus 160. The bus 160 may include a shared bus architecture, a packet switched bus architecture or a circuit switched bus architecture, among others.

Common peripheral devices 130-150 include network interface cards, disk controllers, graphics controllers and the like. These devices typically read or write quantities of data to or from a memory 120 to another device outside the computer system 100. In doing so, the peripheral devices may initiate bus transactions on the bus 160 to transfer a quantity of data. When multiple devices or even a single high-speed device is present on a communication bus 160, the bus 160 can become highly loaded.

Embodiments of the present invention provide a protocol for a communication bus in a computer system. When it is desired to transfer a quantity of data across the bus, the data may be divided into a plurality of packets, each to be transmitted individually. A source transmits the packets serially, in packet order, to a destination on the bus. When the last packet is to be transmitted, the source sets a flag in the transmitted packet to signal the destination to return a response indicating that its processing of the final packet has been completed. When the destination so responds, it impliedly indicates that all earlier transmitted packets were received and processed properly.

Figure 2:
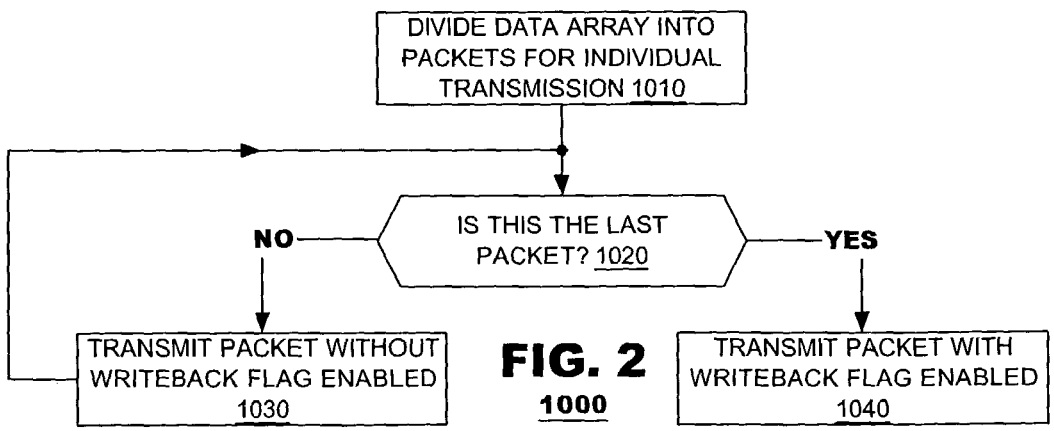
FIG. 2 is a flow diagram of a method according to an embodiment of the present invention.

FIG. 2 is a flow diagram of a method 1000 according to an embodiment of the present invention. The method may begin when a source stores a quantity of data (called an "array" herein) to be transmitted across a communication bus. The method divides the array into a plurality of packets for transmission (box 1010). For each packet, the method determines whether the packet is the last packet in the array (box 1020). If not, the method causes the packet to be transmitted without a "writeback flag" enabled (box 1030). Otherwise, if the packet is the last packet to be transmitted, the writeback flag is enabled and the packet is transmitted across the bus (box 1040). The method may operate continuously until the data array is transmitted in its entirety.

FIG. 3 illustrates a communication flow between a source 310 and a destination 320 using the communication protocol of the foregoing embodiments. In this diagram, the source 310 transmits a data array to the destination as individual packets 1-N. The source initiates a series of transactions on the communication bus and transfers one of the packets across the bus pursuant to that transaction.

As noted, transfer of packets 1 through N−1 (boxes 330-360) may occur without having enabled a writeback flag within the packet. Transfer of the final packet N (box 370) may have the writeback flag enabled. The writeback flag, once detected by the destination 320, may cause the destination to initiate a response to the source 310 in its own transaction, indicating that the data transfer was successfully performed.

FIG. 3 illustrates an example where successful communication is achieved between the source and destination agents.

If successful transmission of an array occurs, a destination agent 320 will transmit only a single response to all packets in the array. If transmission errors occur with respect to a packet (say, packet 2 340), the destination agent 320 may generate a transaction on the bus indicating the occurrence of an error.

The foregoing discussion has illustrated communication between a source and a destination. According to embodiments of the present invention, any of the devices directly coupled to a common communication bus may operate as a source or a destination. FIG. 1, for example, illustrates a bridge interface 170 and a plurality of peripheral devices 130-150 coupled to bus 160. When the bridge interface 170 has data to be transferred to device 2 140, for example, it may function as the source and device 2 may function as a destination in a manner consistent with the disclosure of FIG. 3. At some other point during operation, another device (say, device 1 130) may store data to be transferred to the bridge interface 170; in this example, the bridge interface 170 becomes the destination and the device 1 130 becomes the source.

FIG. 3, for the sake of clarity, omits interstitial communications that may occur on the bus 160 during operation. To provide a degree of fairness in the allocation of bus resources among devices, devices are permitted to request and reserve bus bandwidth on round-robin or other pro rata bases. Thus, if FIG. 3 is representative of a data transfer between the bridge interface 170 and the first device 130 of FIG. 1, the bus 160 may carry not only those packets illustrated in FIG. 3 but additional packets of data pursuant to transactions initiated by other devices (140-150). These other transactions are extraneous to the present discussion and, therefore, have not been shown.

The principles of the present invention may be applied independently to various types of queued data transmissions that commonly are maintained by bus agents. For example, agents typically prioritize various transaction types against each other. Processor read requests typically are deemed of higher priority than transfers of data from main memory to long term storage areas. Alternatively, an agent may maintain separate queues for transmission of data to other agents.

FIG. 4 is a simplified block diagram of a transmitting agent 400 according to an embodiment of the present invention. The agent 400 may include a plurality of queues 410-430, a connection manager 440 and a bus interface 450. To simplify the present discussion, assume that the different queues 410-430 represent transmissions having different levels of priority with respect to each other. When the agent 400 identifies a new data array to be transmitted on a bus, it assigns the array to one of the queues (say, queue 410) according to the array's priority level. The data array is queued, packetized and transmitted on the bus.

According to an embodiment, the agent 400 may implement multiple instances of the method of FIG. 2 simultaneously, one for each queue 410-430 maintained by the device. This embodiment is particularly useful in implementations where an agent 400 drains data from various queues according to some fairness scheme, perhaps a weighted round-robin selection scheme that reflects the relative priorities among the queues. Thus, at various points during operation, the agent 400 may have several partially transmitted arrays in its queues 410-430. By managing each queue with independent instances of the method 1000 (FIG. 2), however, the agent 400 may maintain synchronized communication with the various destination agents on the communication bus.

As noted, in other embodiments, separate queues may be maintained for separate agents on the external bus. Thus, if FIG. 4 hypothetically represented apparatus within the bridge interface 170 (FIG. 1), queue 1 410 may correspond to data destined for device 1 130, queue 2 420 may correspond to data destined for device 2 140, and so on. In this embodiment, the agent 400 may manage data transmissions from the queues 410-430 by maintaining multiple independent instances of the method 1000 (FIG. 2) for each queue.

Figure 5:
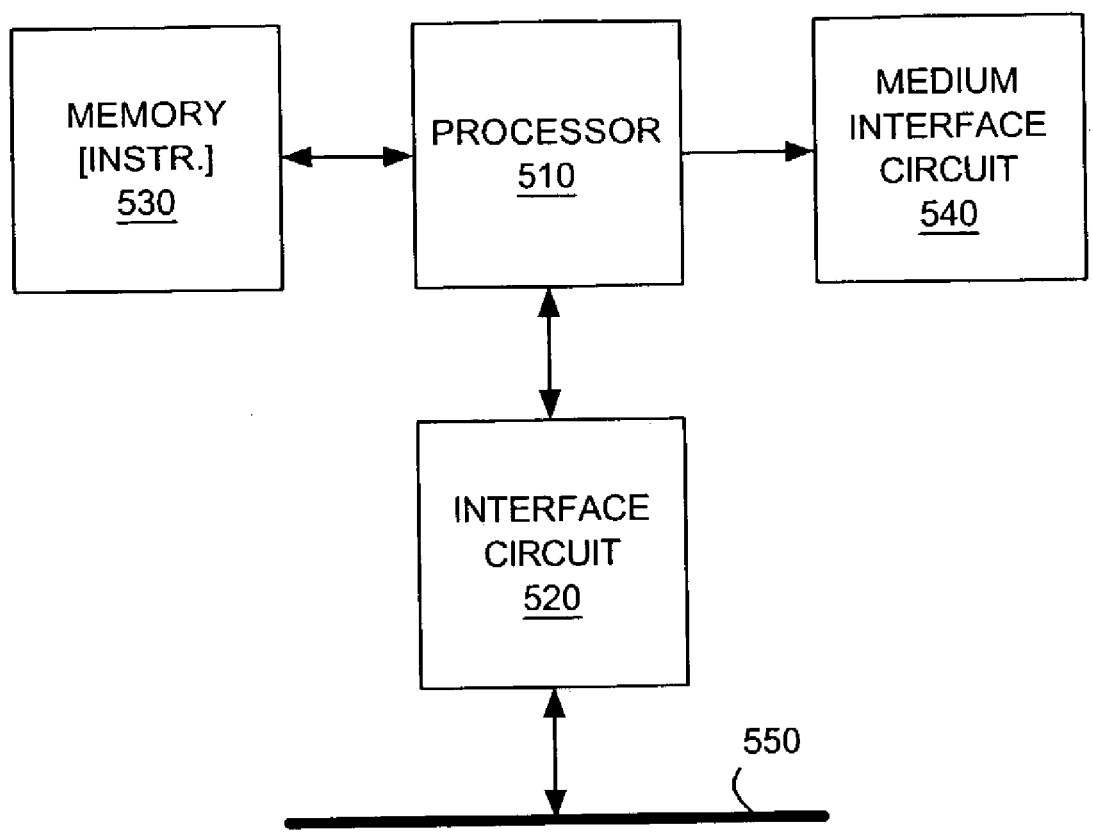
FIG. 5 is a simplified block diagram of a device driver according to an embodiment of the present invention.

The foregoing embodiments also find application in programmable device drivers. FIG. 5 is a simplified block diagram of a device driver 500 according to an embodiment of the present invention. The device driver 500 may include a processor 510, a bus interface circuit 520, a memory 530 and a medium interface circuit 540. The processor 510 may operate according to executable instructions stored in the memory 530. In this embodiment, the executable instructions may cause the processor to operate as described above. The bus interface circuit 520 provides an electrical connection between the processor 510 and a bus 550. The bus interface circuit 520 may generate electrical signals on the bus under command of the processor 510. The medium interface circuit 540 may provide electrical connection between the processor 510 and other components of the device 500 (not shown). As described above, the devices may vary considerably. They may include network interface cards, disk controllers and graphics controllers among others. The medium interface circuit 540 may provide an interface between the processor 510 and the communication apparatus, disk drive or display apparatus as the case may be. Such components are not material to the present discussion and have been omitted for the sake of clarity.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. A communication method for a computer bus, comprising:
    transferring a quantity of data across the bus in a sequence of bus transactions, each bus transaction including a portion of the data provided in a packet and a writeback flag, wherein the writeback flag is enabled for a final transaction in the series and disabled for all other transactions in the sequence; and
    responsive to the enabled writeback flag, generating a transaction by a destination agent on the bus indicating whether all packets in the series of transactions were received properly.

2. The communication method of claim 1, wherein a destination agent on the bus generates no response to any of the transactions in the series having a disabled writeback flag, if the destination agent successfully received packets in those transactions.

3. A communication method, comprising:
    queuing an array of data to be transmitted to an agent,
    dividing the array into packets,
    transmitting the packets to the agent via a communication bus wherein, for all packets except the last one, the packets are transmitted with a disabled writeback flag and the last packet is transmitted with an enabled writeback flag, and
    by the agent and in response to the enabled writeback flag, generating a response to the transmitted array of data.

4. The communication method of claim 3, further comprising, for each of a plurality of agents on the communication bus, maintaining a separate queue for data to be transmitted to each such agent.

5. The communication method of claim 3, further comprising maintaining separate queues for data transmissions of different priorities.

6. The communication method of claim 4, wherein the response indicates that the agent successfully received all of the transmitted packets in the array.

7. The communication method of claim 4, wherein the response indicates that the agent completed a commanded operation with respect to all of the transmitted packets in the array, the commanded operation transmitted to the second agent in association with the transmitted packets.

8. A computer system, comprising:
a plurality of agents coupled to a common communication bus, the agents to exchange data over the bus according to a common bus protocol, wherein:
a transmitting agent of an array of data is to transmit data to a receiving agent in a plurality of bus transactions, each transaction transferring a portion of the array to the receiving agent and including a writeback flag, the writeback flag of all transactions except the last one being disabled and the writeback flag of the last of the plurality of transactions being enabled,
the receiving agent of the array is to generate a response to the enabled writeback flag indicating successful reception of all packets in the array.

9. The computer system of claim 8, wherein the transmitting agent comprises:
a plurality of queues to store arrays of data,
a connection manager to schedule transmissions of packets from the queues,
a bus interface circuit to electrically couple the connection manager to the communication bus.

10. The computer system of claim 8, wherein the transmitting agent is to maintain separate queues to store arrays of data for transmission, one queue for each other agent on the communication bus.

11. The computer system of claim 8, wherein the transmitting agent is to maintain separate queues to store arrays of data for transmission, one queue for each grade of priority supported by the agent.

12. The computer system of claim 8, wherein the transmitting agent comprises:
a processor,
a memory to store executable instructions for the processor, and
an interface circuit to provide an electrical interface between the processor and the communication bus.

13. An agent, comprising:
a bus interface, coupled to a communication bus and to manage the agent's performance of transactions on the bus, wherein:
if the agent is a transmitter of an array of data on the bus, the agent is to generate a plurality of transactions on the bus, each including a portion of the array and a writeback flag, the writeback flags of all except the last in the plurality of transactions being disabled, the writeback flag of the last transaction being enabled,
if the agent is a receiver of an array of data on the bus, the agent captures data of a plurality of transactions on the bus, each transaction including a portion of the array and, in response to an enabled writeback flag in a transaction, to generate another transaction on the bus indicating whether the entire array was received properly.

14. The agent of claim 13, further comprising:
a plurality of queues to store arrays of data,
a connection manager to schedule transmissions of packets from the queues,
a bus interface circuit to electrically couple the connection manager to the communication bus.

15. The agent of claim 13, wherein the agent is to maintain separate queues to store arrays of data for transmission, one queue for each other agent on the communication bus.

16. The agent of claim 13, wherein the agent is to maintain separate queues to store arrays of data for transmission, one queue for grade of transmission priority supported by the agent.

17. The agent of claim 13, wherein the agent comprises:
a processor,
a memory to store executable instructions for the processor, and
an interface circuit to provide an electrical interface between the processor and the communication bus.

18. A computer readable medium, having executable instructions stored therein that, when executed, cause an executing device to:
queue an array of data to be transmitted,
divide the array into packets,
transmit the packets to another device via a common communication medium wherein, for all packets except the last one, the packets are transmitted with a disabled writeback flag and the last packet is transmitted with an enabled writeback flag, the executing device to receive a response from the other device to the enabled writeback flag.

19. The computer readable medium of claim 18, the instructions further causing the executing device to maintain, for each of a plurality of other devices on the communication medium, a separate queue for data to be transmitted to each such other device.

20. The computer readable medium of claim 18, the instructions further causing the executing device to maintain separate queues for data transmissions of different priorities.

21. The computer readable medium of claim 18, wherein the response indicates that the other device successfully received all transmitted packets in the array.

22. The computer readable medium of claim 18, wherein the response indicates that the other device completed a commanded operation with respect to all transmitted packets in the array, the command transmitted to the other device in association with the transmitted packets.

* * * * *